United States Patent [19]

Kelly

[11] Patent Number: 4,749,048
[45] Date of Patent: Jun. 7, 1988

[54] RIPPER ATTACHMENT FOR SKID STEER LOADERS

[76] Inventor: Joseph L. Kelly, 230 N. River Ridge Cir., Burnsville, Minn. 55337

[21] Appl. No.: 938,832

[22] Filed: Dec. 8, 1986

[51] Int. Cl.⁴ .................. A01B 13/08; E02F 5/32
[52] U.S. Cl. .................. 172/699; 37/117.5; 172/272
[58] Field of Search .......... 172/699, 251, 445.2, 172/272; 37/117.5; 299/10, 67

[56] References Cited

U.S. PATENT DOCUMENTS

| | | | |
|---|---|---|---|
| 2,512,114 | 6/1950 | Robinson | 172/445.2 |
| 2,765,724 | 10/1956 | Kinsinger | 172/699 X |
| 3,523,586 | 8/1970 | Kubecka | 172/699 |
| 3,702,712 | 11/1972 | Cairns | 37/117.5 |
| 4,547,984 | 10/1985 | Adams | 37/117.5 |

Primary Examiner—Richard J. Johnson
Attorney, Agent, or Firm—Jacobson and Johnson

[57] ABSTRACT

This invention teaches a simple, rigid and compact ripper attachment for skid steer loaders. The ripper attachment has a triangular frame, a mounting plate attached at the base of the triangular frame, and a scarifier receptacle attached at the apex of the triangular frame. A single shank scarifier is fastened to the apex receptacle and is oriented downward so that the tooth is driveable into the ground for ripping purposes.

1 Claim, 2 Drawing Sheets

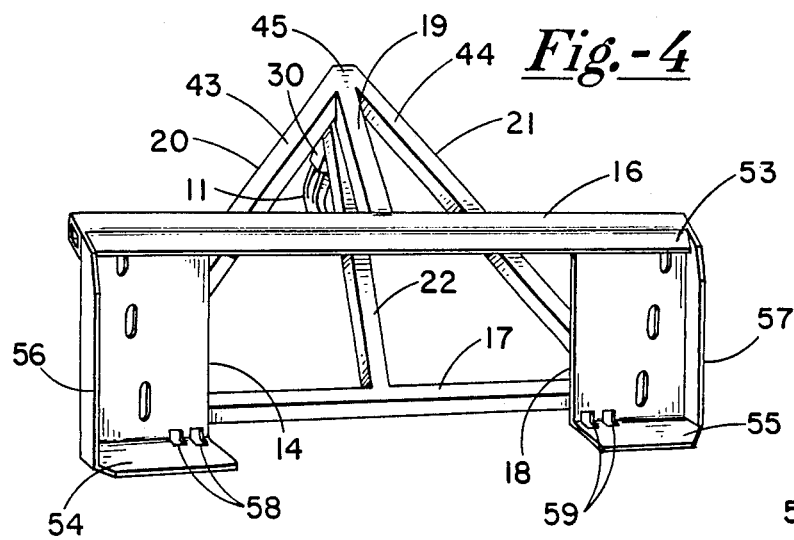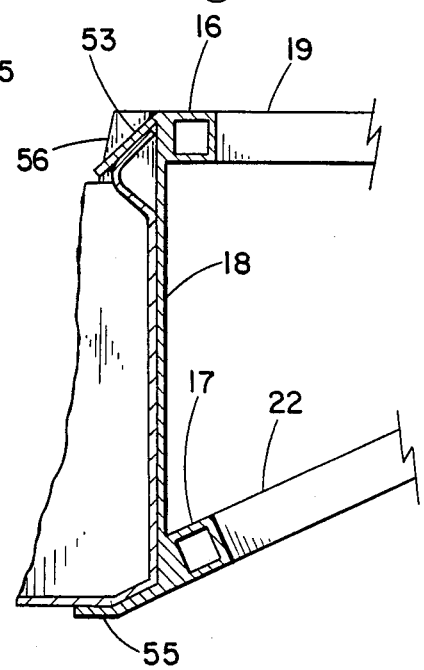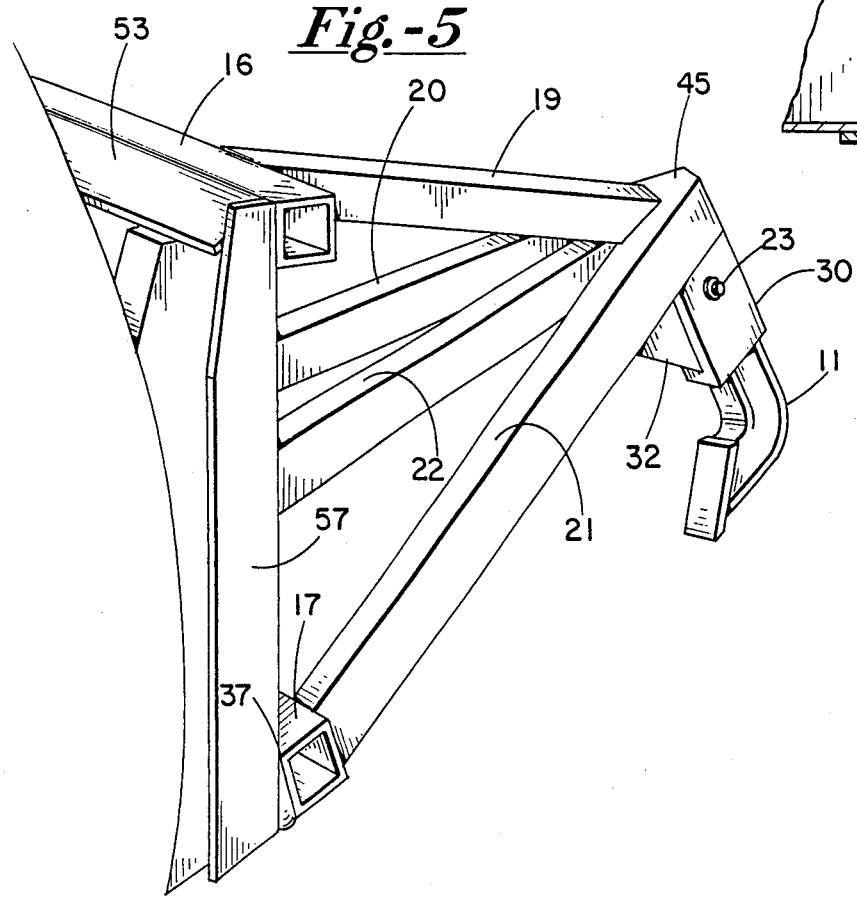

RIPPER ATTACHMENT FOR SKID STEER LOADERS

BACKGROUND OF THE INVENTION

1. Field of the Invention

This invention pertains to attachments for skid steer loaders and, more particularly, to ripper attachments for skid steer loaders.

2. Description of the Prior Art

The prior art discloses a number of scarifier attachments for construction vehicles. Typically the attachments include excavator buckets and means to adjust or maneuver the scarifiers to different orientations. For example, in one position the scarifier may be oriented downward to be driveable into the ground and operated in conjunction with the excavator bucket. In a second position, the scarifier may be oriented upwards to allow the excavator bucket to operate free of interference from the scarifier.

Bean U.S. Pat. No. 4,327,509 shows one means of maneuvering the scarifier. Two hydraulic cylinders are attached to the center pivot pin of the back hoe boom and dipper for extending, retracting, and manipulating the scarifier. The cylinders are supported by the back hoe boom, the dipper, and the bucket, which extends to form a means of support for the scarifier.

In contrast, applicant's invention has excluded the booms, dippers, cylinders and buckets and comprises a simple, rigid, compact frame which is maneuverable because it is attachable to the adjustable arms of a skid steer loader. Moreover, applicant's invention is easily attachable, inexpensive, and affordable by smaller companies or individuals whose needs may include ripping up small areas, such as driveways, for which a bucket-boom-scarifier combination would be prohibitively expensive and superfluous.

SUMMARY OF THE INVENTION

This invention teaches a ripper attachment which includes a triangular or semi-pyramidal frame attached at its base to a pair of plate members and having a scarifier receptacle at its apex. The plates have a number of elongated slots and flanges for ready attachment to the skid steer loader. A conventional single shank scarifier is fastened to the apex receptacle and is oriented so that the tooth is driveable into the ground for ripping purposes. The inwardly curved scarifier includes a planar face to facilitate the lifting of objects.

The attachment does not include any booms, bucket or scoops. Instead, the attachment is simple, compact, rigid and maneuverable by the arms of a skid steer loader to provide a tool for the skid steer operator that is easy to mount, simple to operate, sufficiently small and convergent to use in crowded construction areas, yet sufficiently strong and durable for ripping asphalt, cement, frozen ground, etc.

BRIEF DESCRIPTION OF THE DRAWINGS

FIG. 4 is a rear perspective view.

FIG. 5 is a perspective view of the attachment means.

FIG. 6 is a cross-sectional view of FIG. 5.

DESCRIPTION OF THE PREFERRED EMBODIMENTS

Figures 1, 2, 3:
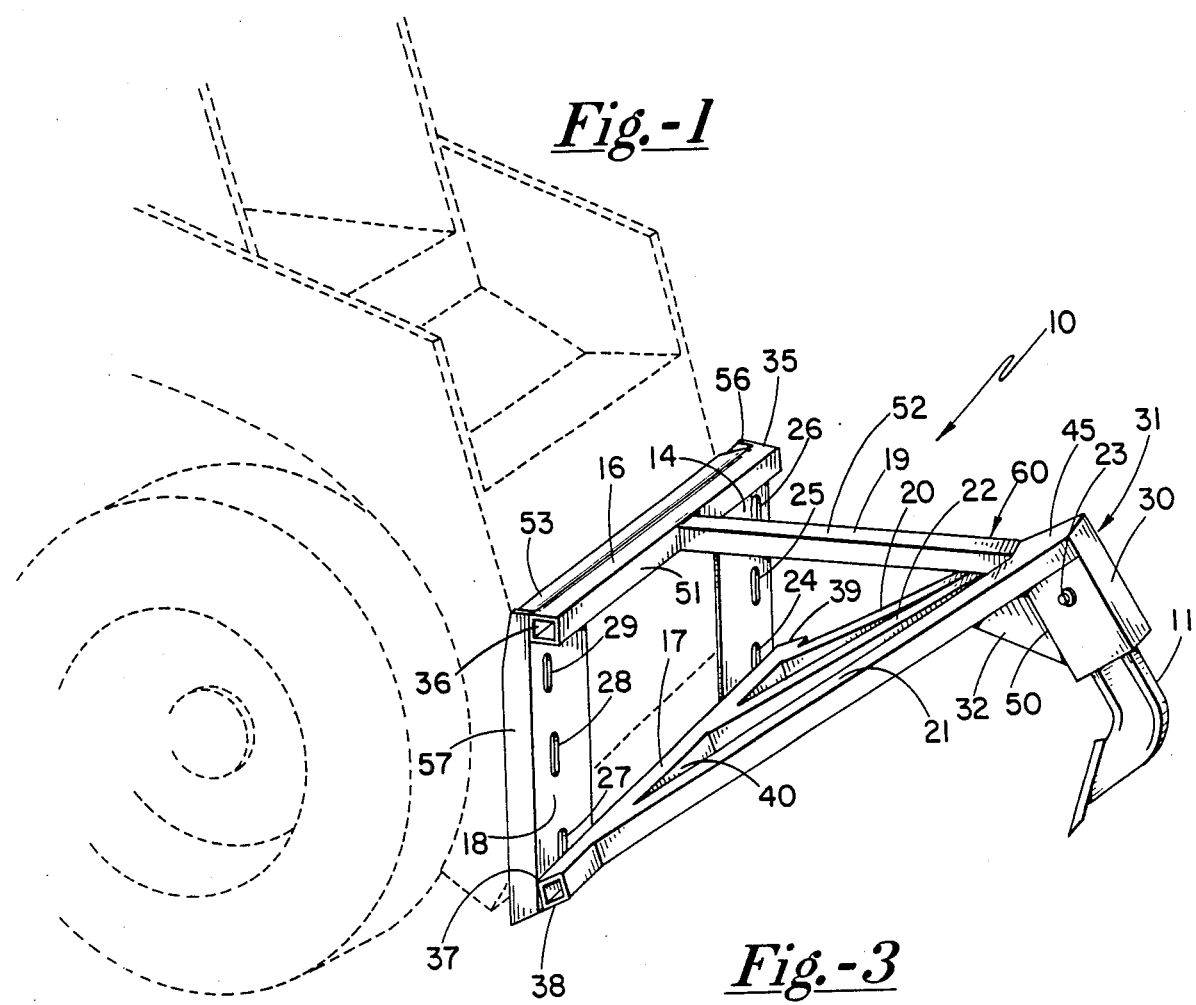
FIG. 1 is a side perspective view of my ripper attachment fastened to a skid steer loader.
FIG. 2 is a side plan view of my ripper attachment.
FIG. 3 is a top plan view.

The skid steer loader is among the smallest and least expensive of construction vehicles. By virtue of its size and maneuverability, it is useful in small or congested construction sites. Furthermore, for smaller construction jobs, it is cost-effective to use a skid steer loader rather than a larger vehicle having an excavator bucket, dipper and boom.

Applicant's invention takes advantage of the characteristics of the skid steer loader. Typically, skid steer loaders include a pair of arms, which are hydraulically operated, with a mounting plate attached therebetween. The arms and mounting plate may be raised, lowered, and tilted much like an excavator bucket having booms and dippers. Applicant has recognized that, since the skid steer loader has maneuverable arms as an integral part of its structure, a ripper attachment need not include a bucket-boom-dipper-scarifier combination for maneuvering the scarifier, but need only include a scarifier attached to a triangular or semi-pyramidal frame that is easily attachable to a mounting plate of a skid steer loader, which itself is the means for maneuvering the scarifier.

Ripper attachemnt 10 generally comprises a scarifier 11, a scarifier receptacle 30, a pair of mounting plates 14–18 and a triangular or semi-pyramided frame 60 between the mounting plates 14–18 and the receptacle 30. The mounting plates comprise a pair of spaced-apart coplanar plate members 14 and 18, an upper support member 16 rigidly attached, such as by welding, across the plate members at their upper edges and a lower parallel support member 17 attached at or near the bottom edges of plate members 14 and 18. Support members 16 and 17 are preferably elongated square tube steel bars. Plate members 14 and 18 have a plurality of elongated perforations 24–29 for use in coupling the ripper attachment to the skid steer lift arms. One face 33 of support member 16 is attached along the uppermost sections of plates 14 and 18 so that another face 34 lies flush with the top edges of plates 14 and 18 and so that the perpendicular ends 35 and 36 of member 16 are flush with the outermost edges of plates 14 and 18, respectively. Support member 17 is rigidly attached, such as by welding, to the bottom portions of plates 14 and 18 along a corner 37 so that perpendicular ends 38 and 39 of support member 17 lie flush with the outermost edges of plates 14 and 18, respectively.

Support member 17 provides a base and a support for a first lower protruding support member 20, a second lower protruding support member 21, and an inner protruding support member 22, all of which preferably comprise elongated square tube steel bars. Members 20 and 21 are rigidly and angularly attached, such as by welding, at one end to a face 40 of support member 17 at or near ends 38 and 39, respectively, of member 17 and member 22 is similarly attached at one end to about the center of face 40 of member 17 so that all members 20, 21 and 22 are in a common plane with member 17. Members 20 and 21 protrude from member 17 angled toward each other and are rigidly attached at their other ends, such as by welding, to a scarifier receptacle 30. Member 20 is attached to the uppermost portion of a first face 41 of scarifier receptacle 30 and member 21 is attached to the uppermost portion of a second face 42 of scarifier receptacle 30 so that faces 43 and 44 of members 20 and 21 are in the same plane as the top end 45 of scarifier receptacle 30. Furthermore, an end 46 of member 20 and an end 47 of member 21 lay flush with the front end 48 of scarifier receptacle 30. Member 22 is rigidly attached, such as by welding, at one end to the rear end 50 of scarifier receptacle 30, a triangular brace 32, and to one end of an upper protruding support member 19. The triangular brace 32 is rigidly attached to the rear end 50 of scarifier receptacle 30.

Upper protruding support member 19, which is preferably an elongated square tube bar, is rigidly and perpendicularly attached, such as by welding, at one end to about the center of face 51 of upper parallel support member 16 with the upper face 52 of member 19 lying flush with the upper face of support member 16. Member 19 is attached at its other end to support member 22 about at the rear of scarifier receptacle 30. Together members 20 and 21 define a triangular shaped frame with a base at member 17 and scarifier receptacle 31 at its apex. Member 22 serves to reinforce the triangular frame. The addition of upper protruding further reinforcing member 19 makes frame 60 somewhat semi-pyramidal.

Scarifier receptacle 30 is located at the apex 31 of ripper attachment 10 and has an opening 61 for holding the shank of scarifier 11 which is removably secured in place by bolt 23. In conventional fashion, the curved tooth 13 of scarifier 11 is used for ripping up asphalt, cement, frozen earth, etc. and may also be used to raise or lift up heavy objects. While the drawings show the scarifier tooth 13 curved rearward toward the skid steer loader, it should be noted that scarifier 11 may be held so that the tooth curves forwardly, if desired.

The means for securing ripper attachment 10 to the mounting plate of the skid steer loader include a rearwardly extending and downwardly angled top flange 53 which is rigidly attached, such as by welding, to the top of support member 16; a rearwardly extending first bottom flange 54 which is rigidly attached, such as by welding, to the rear bottom portion of plate 14; a rearwardly extending second bottom flange 55 which is rigidly attached to the rear bottom portion of plate 18; a rearwardly extending first side flange 56 which is rigidly attached to the outer side portion of plate 14; and a rearwardly extending second side flange 57 which is rigidly attached to the outer side portion of plate 18. Flanges 54 and 55 are also rigidly attached at their ends to the bottom ends of side flanges 56 and 57 but extend somewhat further rearwardly. Slot-like openings 58 and 59 in plate members 14 and 18 are for latching onto the skid steer loader mounting plate.

I claim:

1. A ripper attachment for a skid steer loader comprising:

a pair of plates, each of said plates having a top front and a bottom front, a bottom parallel support member, a top parallel support member having a middle, said parallel support members rigidly attached to said top front and said bottom front of said plates, an apex member, a plurality of lower protruding support members rigidly attached to said bottom parallel support member and extending angularly forward and upward therefrom to said apex member to form a triangular shape, an upper protruding support member, said upper protruding support member rigidly attached to said middle of said top parallel support member and extending to said apex member, said top parallel support member and said bottom parallel support members being rigidly attached to said apex member, said pair of plates being adaptable for attachment to a mounting plate of a skid steer loader; and means for attaching a scarifier to said apex member whereby said scarifier is driveable into the ground for ripping purposes.

* * * * *